N. W. WHEELER.
Damper.

No. 41,457.  Patented Feb. 2, 1864.

Witnesses  Inventor

UNITED STATES PATENT OFFICE.

N. W. WHEELER, OF RIPON, WISCONSIN.

IMPROVEMENT IN DAMPERS.

Specification forming part of Letters Patent No. 41,457, dated February 2, 1864.

*To all whom it may concern:*

Be it known that I, N. W. WHEELER, of Ripon, in the State of Wisconsin, have invented certain new and useful Improvements in Stove-Pipe Dampers; and I hereby declare that the following is a true and exact description of the same, reference being had to the accompanying drawings, and to the letters of reference marked thereon.

The nature of my invention consists in the use of certain devices to regulate the escape of smoke and heat through a stove-pipe.

Figure 1:
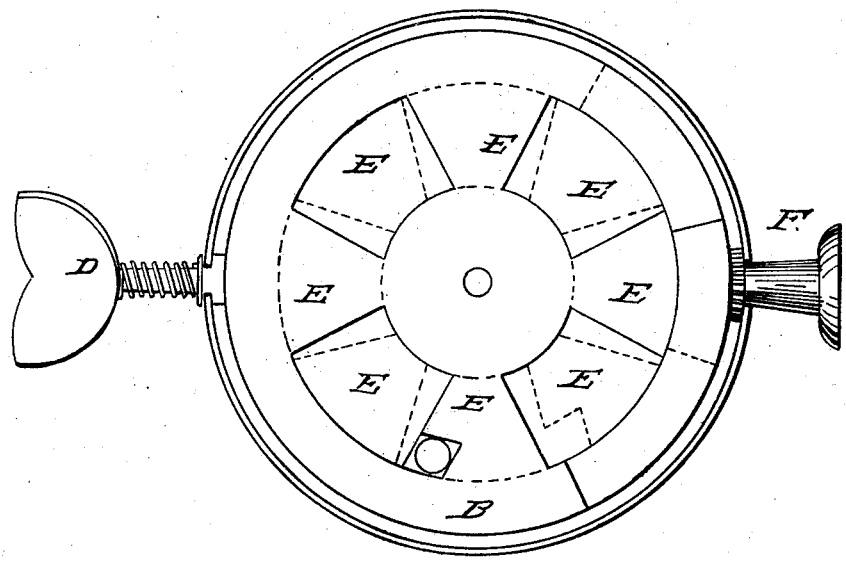
Figure 2:
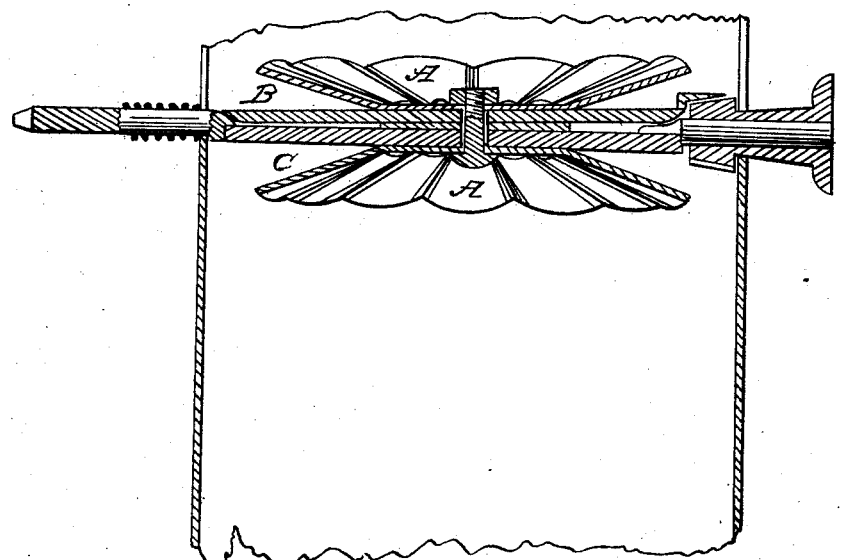

Figure 1 in the annexed drawings represents a plan view of the damper. Fig. 2 represents a vertical section of the damper and wheels B and C in position.

The letter A represents two metal plates, corrugated and slightly concave, the top plate having the concave surface up and the bottom plate having the concave down. Each plate is flattened near the center that it may rest firmly against the wheels B and C when in position. B and C are made of thicker metal than plates A. The plates A and wheels B and C are secured together by a bolt which passes through their center. The wheel B and the upper plate A are made to turn on the bolt, while the lower wheel, C, and the lower concave, A, remain stationary. There is a small space left between the wheels B and C, this space being increased by a raised portion of B extending about one-fifth of the diameter of B. This raised segment is designed to furnish space for the admission of the pivot F, which supports one edge of the damper, D supporting the opposite edge. On an enlargement of pivot F, immediately inside of the stove-pipe, there is a series of cogs, which gear in corresponding cogs formed in the under side of wheel B. The wheels B and C have corresponding openings in them. (Represented by the letter E.) These openings are opposite to each other when the pivot F is at the extreme right of the cogs in B, but by turning the pivot from left to right the opening in B is brought immediately over the solid metal between the openings in C, thus preventing the direct passage of the heat and smoke upward, and compelling it to escape through the narrow space between the upper and lower wheels. The object of this arrangement is to adapt these flues or openings to the condition of the atmosphere.

When the air is light, as in damp weather, it will be necessary to adjust the wheel B so as to enlarge the openings E and admit of the free escape of the smoke. When on the other hand the air is dry and elastic, these openings can be partially closed, and yet afford sufficient vent to the smoke, while the heat, in obedience to the law of radiation, will be reflected back and conduce to increase the temperature of the room.

It will be observed, also, that when the openings in wheels B and C are opposite to each other that most of the heat that passes through these openings will be reflected back from the under side of the upper plate, A.

Having thus described my invention, what I claim, and desire to secure by Letters Patent, is—

The wheels B and C, the plates A, and the pivot F, the whole constructed and arranged substantially as herein set forth.

In testimony that I acknowledge the above I hereby affix my signature in the presence of two witnesses.

N. W. WHEELER.

Witnesses:
JAY MAYHAM,
J. B. MAYHAM.